(12) United States Patent
Tamaoki et al.

(10) Patent No.: US 11,940,428 B2
(45) Date of Patent: Mar. 26, 2024

(54) PREPARATIVE LIQUID CHROMATOGRAPH

(71) Applicant: SHIMADZU CORPORATION, Kyoto (JP)

(72) Inventors: Soichiro Tamaoki, Kyoto (JP); Tomoyuki Yamazaki, Kyoto (JP); Shohei Sato, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 178 days.

(21) Appl. No.: 17/680,383

(22) Filed: Feb. 25, 2022

(65) Prior Publication Data

US 2022/0299488 A1   Sep. 22, 2022

(30) Foreign Application Priority Data

Mar. 18, 2021   (JP) .................. 2021-044357

(51) Int. Cl.
*G01N 30/86* (2006.01)
*G01N 30/16* (2006.01)
*G01N 30/80* (2006.01)
*G01N 30/02* (2006.01)

(52) U.S. Cl.
CPC .......... *G01N 30/8651* (2013.01); *G01N 30/16* (2013.01); *G01N 30/80* (2013.01); *G01N 2030/027* (2013.01)

(58) Field of Classification Search
CPC .. G01N 30/80; G01N 30/82; G01N 2030/027; B01D 15/247
See application file for complete search history.

(56) References Cited

U.S. PATENT DOCUMENTS

| | | | | |
|---|---|---|---|---|
| 4,724,081 A | * | 2/1988 | Kawahara | .......... B01D 15/1814 |
| | | | | 210/659 |
| 7,862,724 B2 | * | 1/2011 | Osaka | .................... G01N 30/82 |
| | | | | 210/656 |
| 8,175,817 B2 | * | 5/2012 | Pauli | .................. G01N 30/8675 |
| | | | | 702/25 |
| 8,305,582 B2 | * | 11/2012 | Anderson | .............. G01N 30/72 |
| | | | | 356/440 |
| 11,047,834 B2 | * | 6/2021 | Yamazaki | ........... B01D 15/424 |
| 2020/0033303 A1 | | 1/2020 | Tamaoki | |

FOREIGN PATENT DOCUMENTS

WO   2018/185872 A1   1/2020

\* cited by examiner

*Primary Examiner* — Justin N Olamit
(74) *Attorney, Agent, or Firm* — Renner, Otto, Boisselle & Sklar, LLP

(57) ABSTRACT

A preparative liquid chromatograph including an analysis channel (2), an injector (6), a separation column (8), a detector (10), a plurality of fraction collectors (14-1 to 14-n), a switching valve (12) that switches fraction collectors (14-1 to 14-n) to be connected to the outlet of the detector (10) among the plurality of fraction collectors (14-1 to 14-n), and a controller (16) for controlling operations of the plurality of fraction collectors (14-1 to 14-n) and the switching valve (12). In a case where the number of remaining unused collection containers of the fraction collector in use, which is connected to the outlet of the detector, falls below the number of buffers which is an integer of two or more, the controller (16) is configured to switch the switching valve (12) while the fraction collector in use is not performing a peak collection operation.

4 Claims, 3 Drawing Sheets

PREPARATIVE LIQUID CHROMATOGRAPH

BACKGROUND OF THE INVENTION

1. Field of the Invention

The present invention relates to a preparative liquid chromatograph.

2. Description of the Related Art

A preparative liquid chromatograph for fractionation and collection of components in a sample is known (see WO 2018/185872 A). The preparative liquid chromatograph is a system in which components in a sample injected into a mobile phase flowing through an analysis channel are separated by a separation column, peaks of the separated components are detected based on a signal of a detector, and the detected peaks are fractionated and collected in individual collection containers by a fraction collector provided at a subsequent stage of the detector.

SUMMARY OF THE INVENTION

The preparative liquid chromatograph is used in various fields such as the pharmaceutical/CRO fields, but there is a demand for using a lot of collection containers at a time in a field where many different components are extracted at a time. However, because the number of collection containers that can be installed in one fraction collector is limited, it is conceivable to introduce a plurality of fraction collectors into a system of a preparative liquid chromatograph. As a method of introducing a plurality of fraction collectors into the system, a method of connecting a plurality of fraction collectors in series to an outlet of a detector and a method of providing a plurality of fraction collectors in parallel and switching the fraction collectors to be used for peak extraction with a switching valve can be considered.

When a plurality of fraction collectors are connected in series to an outlet of a detector, the channel length from the detector to a fraction collector positioned downstream of the channel becomes long as the position goes downstream. Then, a peak diffuses into the mobile phase before reaching the downstream fraction collector, and the peak width at the time of reaching the fraction collector becomes wider than the peak width at the time of being detected by the detector, which leads to a problem of difficulty in accurate collection of the peak with the downstream fraction collector.

On the other hand, when a plurality of fraction collectors are provided in parallel, the channel lengths from the detector to the fraction collectors can be equalized, and therefore the problem of peak diffusion as described above does not occur. However, because the mobile phase does not flow to fraction collectors other than the fraction collector in use (the fraction collector connected to the outlet of the detector), there arises a problem, when the switching valve is switched while any of the fraction collectors is performing the peak collection operation, that apart of a peak is left in the channel between the fraction collector that have performed the collection operation immediately before the switching valve is switched and the switching valve, and the part of the peak cannot be collected. Such a problem occurs when unused collection containers of the fraction collector in use run short while a peak is collected and switching to another fraction collector has to be performed.

Therefore, an object of the present invention is to prevent a part of a peak from being left in a channel while providing a plurality of fraction collectors in parallel in a preparative liquid chromatograph.

A preparative liquid chromatograph according to the present invention includes an analysis channel through which a mobile phase flows, an injector that injects a sample into the mobile phase, a separation column provided downstream of the injector on the analysis channel for separating components in the sample injected into the mobile phase, a detector for detecting peaks of components separated by the separation column, a plurality of fraction collectors configured to fractionate the peaks detected by the detector at a downstream of the detector and to collect the peaks into collection containers respectively, a switching valve that is interposed between an outlet of the detector and the plurality of fraction collectors and switches fraction collectors to be connected to the outlet of the detector among the plurality of fraction collectors, and a controller for controlling operations of the plurality of fraction collectors and the switching valve, wherein in a case where the number of remaining unused collection containers of the fraction collector in use, which is connected to the outlet of the detector, falls below the number of buffers which is an integer of two or more, the controller is configured to switch the switching valve while the fraction collector in use is not performing a peak collection operation. The "peak collection operation" performed by the fraction collector means an operation of causing a probe provided in the fraction collector to communicate with the outlet of the detector and dropping an eluate containing a peak from the tip of the probe to the collection container at a timing when the peak detected by the detector reaches the fraction collector to collect the eluate containing the peak in the collection container.

According to the preparative liquid chromatograph of the present invention, the fact that the number of unused collection containers of the fraction collector in use falls below the number of buffers which is an integer of two or more triggers switching of the switching valve. This means no occurrence of a situation in which the fraction collector is switched only after the number of remaining unused collection containers in the fraction collector in use becomes zero. This suppresses the occurrence of a situation in which the number of unused collection containers of the fraction collector in use becomes zero while the peak collection operation is being performed. Because the switching valve is switched in a period of time when the fraction collector in use does not perform the peak collection operation, the fraction collector is not switched until the collection operation being performed is completed even if the number of unused collection containers of the fraction collector during the peak collection operation falls below the number of buffers. This prevents a part of the peak from being left in the channel.

BRIEF DESCRIPTION OF THE DRAWINGS

FIGS. 3A to 3C are diagrams for explaining switching of fraction collectors in the embodiment, wherein FIG. 3A is a chromatogram, FIG. 3B is a diagram showing an empty state of collection containers before peak collection, and FIG. 3C is a diagram showing an empty state of collection containers after peak collection.

DETAILED DESCRIPTION OF THE INVENTION

Hereinafter, an embodiment of a preparative liquid chromatograph according to the present invention will be described with reference to the drawings.

Figure 1:
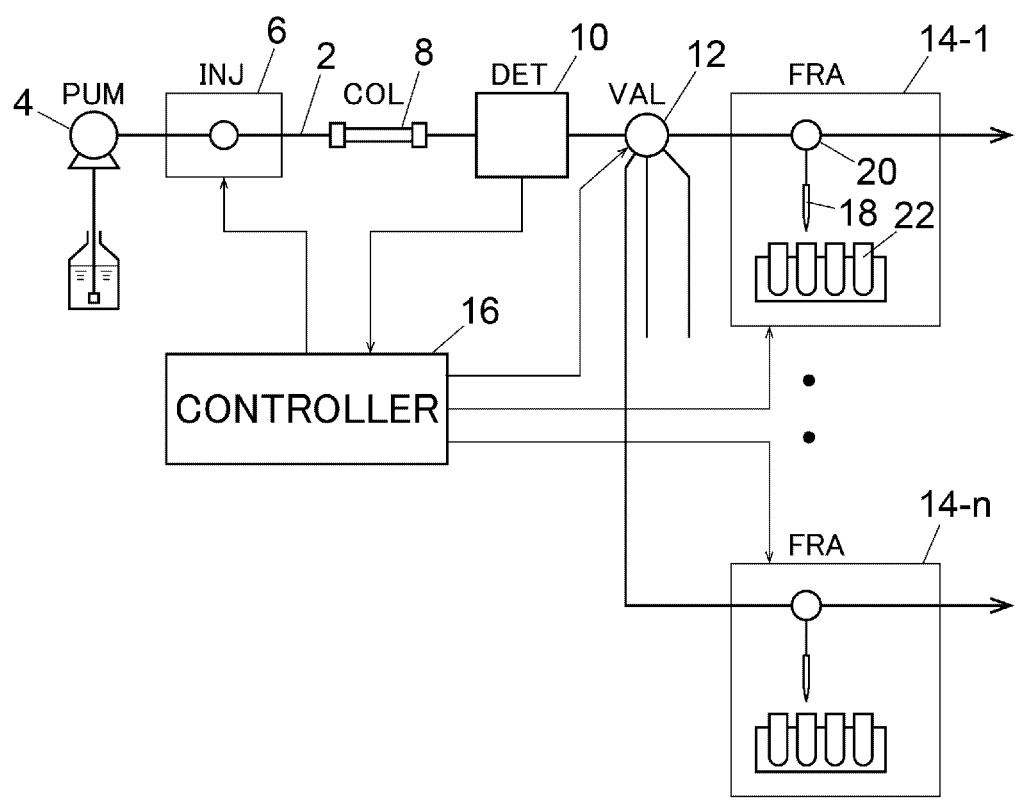
FIG. 1 is a schematic configuration diagram showing an embodiment of a preparative liquid chromatograph.

As shown in FIG. 1, the preparative liquid chromatograph includes an analysis channel 2, a liquid feeding pump 4 (PUM), an injector 6 (INJ), a separation column 8 (COL), a detector 10 (DET), a switching valve 12 (VAL), a plurality of fraction collectors 14-1 to 14-$n$ (FRA), and a controller 16. The number n of the fraction collectors 14 takes any number.

The liquid feeding pump 4 feeds a mobile phase in the analysis channel 2. The injector 6 is a device that injects a sample into the mobile phase flowing through the analysis channel 2. The separation column 8 is provided downstream of the injector 6 on the analysis channel 2, and the components of the sample injected into the mobile phase by the injector 6 are separated from each other in the separation column 8. The detector 10 is provided downstream of the separation column 8 on the analysis channel 2, and a peak of each component separated in the separation column 8 is detected based on a detection signal of the detector 10.

The plurality of fraction collectors 14-1 to 14-$n$ are provided in parallel at a downstream of the detector 10 via the switching valve 12. That is, the switching valve 12 is interposed between the outlet of the detector 10 and the fraction collectors 14-1 to 14-$n$, and is provided so as to selectively connect any one of the fraction collectors 14-1 to 14-$n$ to the outlet of the detector 10. Each of the fraction collectors 14-1 to 14-$n$ includes a movable probe 18 and an electromagnetic valve 20 for switching the channel on the downstream side of the switching valve 12 between a connection to the probe 18 and a connection to the drain. Each of the fraction collectors 14-1 to 14-$n$ is provided with a plurality of collection containers 22 for collecting peaks of the components separated in the separation column 8.

The controller 16 is realized by a computer device including a central processing unit (CPU) and a storage device, and controls operations of the injector 6, the switching valve 12, and the fraction collectors 14-1 to 14-$n$. In particular, the controller 16 is configured to control the operations of the switching valve 12 and the fraction collectors 14-1 to 14-$n$ based on an output signal from the detector 10 such that the peak of each component separated by the separation column 8 is fractionated and collected in the collection container 22.

The controller 16 is provided with a storage part that stores a preset number of buffers. The number of buffers may be a specified value or an integer of two or more freely set by a user. The controller 16 is configured to detect, in a series of operations related to the fractionation and collection of the peak of each component in the sample, that the number of unused collection containers 22 in the fraction collector in use falls below the number of buffers as a trigger for switching the switching valve 12 and use the fraction collectors 14-1 to 14-$n$ in a predetermined order while switching the switching valve 12. When detecting the trigger for switching the switching valve 12, the controller 16 switches the switching valve 12 to use the next fraction collector only in a period of time when the peak collection operation is not performed, for example, immediately after the peak collection operation is completed. The "fraction collector in use" means a fraction collector connected to the outlet of the detector 10.

Figure 2:
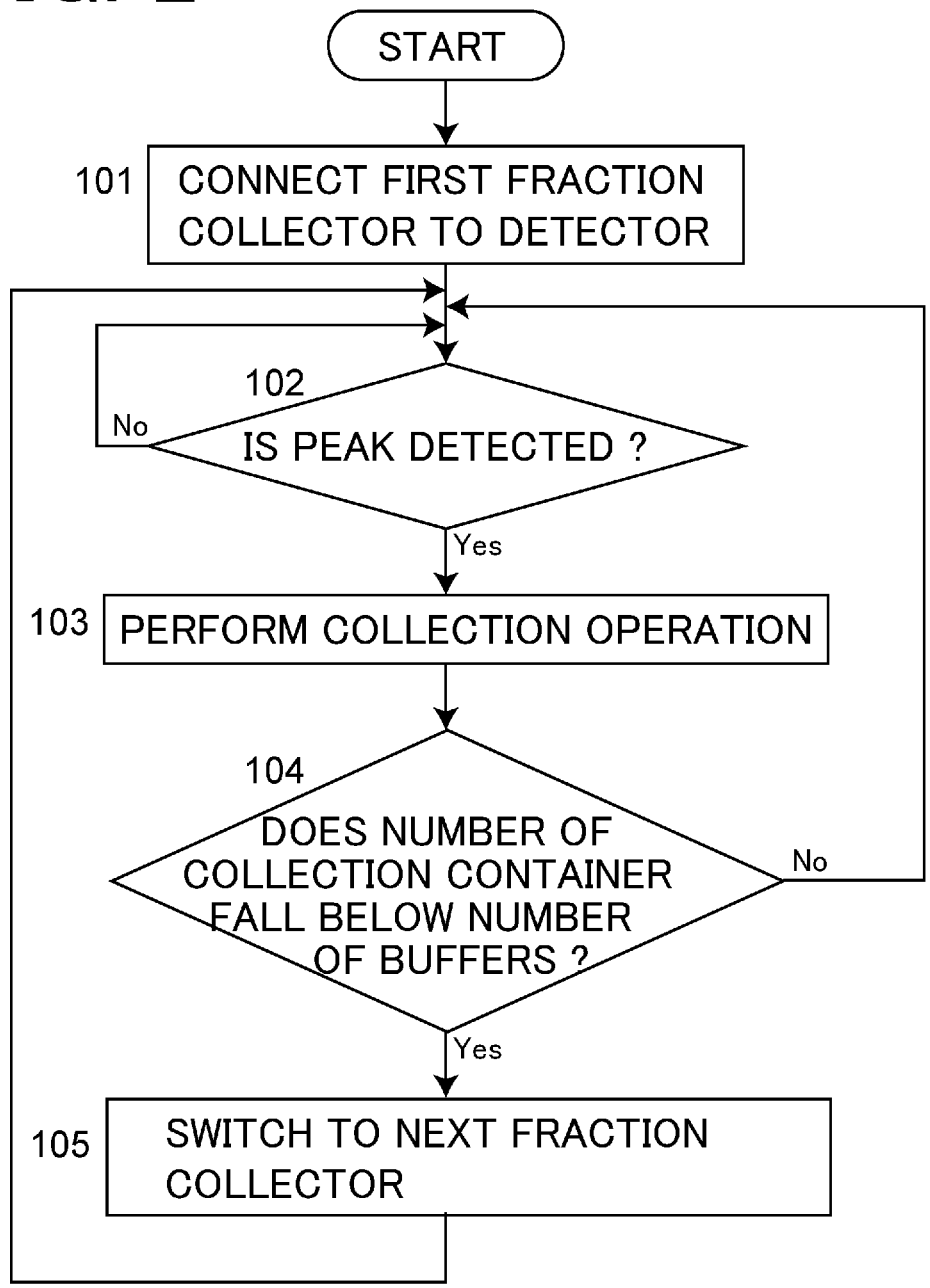
FIG. 2 is a flowchart showing an example of an operation of the embodiment.

A series of operations related to extraction of components in a sample in this embodiment will be described with reference to FIG. 1 and the flowchart in FIG. 2.

When a sample injection by the injector 6 is performed and extraction is started, the controller 16 controls the switching valve 12 to connect the fraction collector 14-1 (first fraction collector) that is set to be firstly used to the outlet of the detector 10 (step 101). The controller 16 detects a peak of a component to be fractionated and collected using a chromatogram obtained based on an output signal from the detector 10 (step 102) and causes the fraction collector 14-1 to perform a collection operation of collecting the detected peak in the collection container 22 (step 103). For the detection of a peak, for example, a method of detecting a start point and an end point of a peak by comparing a slope in the chromatogram with a preset threshold value can be used.

The controller 16 monitors the availability of each collection container 22 provided in the fraction collector 14-1 in use and can detect the number of remaining unused collection containers 22 in the fraction collector 14-1 in use. The controller 16 determines whether or not the number of remaining unused collection containers 22 in the fraction collector 14-1 in use is below the number of buffers while the peak collection operation is being performed or after the peak collection operation is completed. When the number of unused collection containers 22 in the fraction collector 14-1 in use falls below the number of buffers, the switching valve 12 is switched such that the next fraction collector 14-2 is connected to the outlet of the detector 10 after the peak collection operation is completed (step 105: Yes). When the number of unused collection containers 22 in the fraction collector 14-1 is equal to or more than the preset number of buffers, the same fraction collector 14-1 is caused to continuously perform the collection operation of the next peak without switching the switching valve 12 (Step 105: No). In this manner, every time the number of unused collection containers 22 in the fraction collector in use falls below the number of buffers, the switching valve 12 is switched at the timing when the fraction collector in use is not performing the collection operation.

As described above, the controller 16 can perform detection of the trigger for switching the switching valve 12 during the collection operation by determining whether or not the number of unused collection containers 22 in the fraction collector in use is below the number of buffers. Then, when the trigger for switching the switching valve 12 is detected in the collection operation, the switching valve 12 can be switched immediately after the collection operation being performed is completed.

Figure 3A:
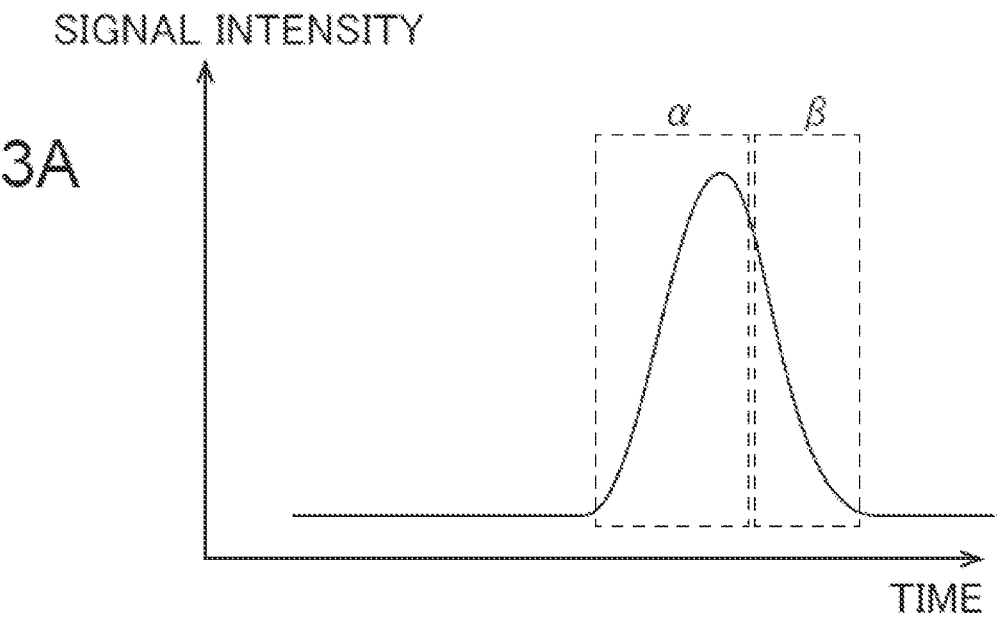
Figure 3B:
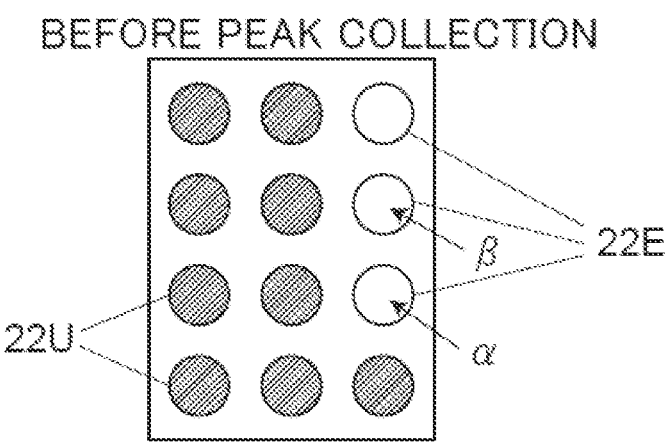
Figure 3C:
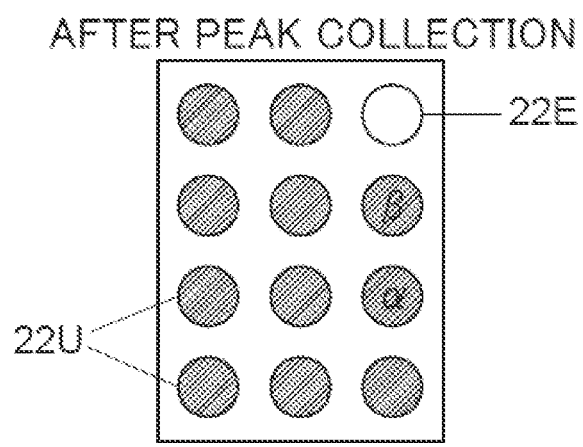

A specific description will be given using the example of FIG. 3. FIG. 3A shows a peak waveform on a chromatogram of a certain component in the sample, FIG. 3B shows a usage of the collection containers 22 of the fraction collector in use at a time point before collecting this peak, and FIG. 3C shows a usage of the collection containers 22 of the fraction collector in use after collecting this peak. In FIGS. 3B and 3C, the hatched collection containers 22U are used collection containers (in which a peak is collected), and the unhatched collection containers 22E are unused collection containers.

In the example of FIG. 3, it is assumed that the number of buffers is set to two. Because the number of the unused collection containers 22E is three in the fraction collector in use at a time point before collecting the peak, the controller 16 does not detect the trigger for switching the switching valve 12. When the peak collection operation is started in the fraction collector in use from this state, the number of the unused collection containers 22E decreases to two but does not fall below the number of buffers, and therefore the controller 16 does not detect the trigger for switching the switching valve 12.

Thereafter, when the collection amount in the first collection container reaches a specified value when the first half "α" of the peak is collected, the next unused collection container 22E is used to collect the second half "β" of the peak. Then, as shown in FIG. 3C, the number of the unused collection containers 22E becomes one, which is below the number of buffers. At this time, the controller 16 detects the trigger for switching the switching valve 12 but does not immediately switch the switching valve 12. The controller 16 switches the switching valve 12 after the collection operation being performed is completed, that is, after the collection of the second half "β" of the peak is completed.

The controller 16 may be configured to determine whether or not the number of unused collection containers 22 in the fraction collector is below the number of buffers immediately after the fraction collector completes the peak collection operation, and immediately switch the switching valve 12 if the number of unused collection containers 22 is below the number of buffers. In any case, because the switching of the switching valve 12 is performed in a period of time when the peak collection operation is not performed in the fraction collectors 14-1 to 14-$n$, the peak is not left in the channel between the switching valve 12 and the fraction collectors 14-1 to 14-$n$, which can prevent a decrease in the recovery rate of the peak.

The embodiment described above is merely an example of an embodiment of the preparative liquid chromatograph according to the present invention. The embodiment of the preparative liquid chromatograph according to the present invention is as follows.

An embodiment of the preparative liquid chromatograph according to the present invention includes an analysis channel through which a mobile phase flows, an injector that injects a sample into the mobile phase, a separation column provided downstream of the injector on the analysis channel for separating components in the sample injected into the mobile phase, a detector for detecting peaks of components separated by the separation column, a plurality of fraction collectors configured to fractionate the peaks detected by the detector at a downstream of the detector and to collect the peaks into collection containers respectively, a switching valve that is interposed between an outlet of the detector and the plurality of fraction collectors and switches fraction collectors to be connected to the outlet of the detector among the plurality of fraction collectors, and a controller for controlling operations of the plurality of fraction collectors and the switching valve, wherein in a case where the number of remaining unused collection containers of the fraction collector in use, which is connected to the outlet of the detector, falls below the number of buffers which is an integer of two or more, the controller is configured to switch the switching valve while the fraction collector in use is not performing a peak collection operation.

In a first aspect of the embodiment, in a case where the number of the unused collection containers of the fraction collector in use falls below the number of buffers while the fraction collector in use is performing the collection operation, the controller is configured to switch the switching valve immediately after the collection operation, which is during be performed by the fraction collector in use, is completed. Such an aspect enables a connection of the fraction collector to be used next to the outlet of the detector immediately after the collection operation in the fraction collector in use is completed and when the switching valve can be switched and a prompt preparation for collecting the next peak.

In a second aspect of the embodiment, the controller includes a storage part configured to store an integer of two or more set by a user as the number of buffers. Such an aspect enables the user to be freely set the number of buffers according to the amount of components contained in the sample, analysis conditions, and the like.

In a third aspect of the embodiment, the controller is configured to detect a start point and an endpoint of each peak based on a peak waveform of a chromatogram created by using an output signal from the detector, and to control operations of the plurality of fraction collectors and the switching valve based on the detected start point and end point of each peak.

DESCRIPTION OF REFERENCE SIGNS

2: analysis channel
4: liquid feeding pump
6: injector
8: separation column
10: detector
12: switching valve
14-1 to 14-$n$: fraction collector
16: controller
18: probe
20: electromagnetic valve
22: collection container
22E: unused collection container
22U: used collection container

What is claimed is:

1. A preparative liquid chromatograph comprising:
an analysis channel through which a mobile phase flows;
an injector that injects a sample into the mobile phase;
a separation column provided downstream of the injector on the analysis channel for separating components in the sample injected into the mobile phase;
a detector for detecting peaks of the components separated by the separation column;
a plurality of fraction collectors configured to fractionate the peaks detected by the detector at a downstream of the detector and to collect the peaks into collection containers respectively;
a switching valve that is interposed between an outlet of the detector and the plurality of fraction collectors and switches fraction collectors to be connected to the outlet of the detector among the plurality of fraction collectors; and
a controller for controlling operations of the plurality of fraction collectors and the switching valve,
wherein in response to a number of remaining unused collection containers of a fraction collector in use, which is connected to the outlet of the detector, falling below a predetermined number which is an integer of two or more, the controller is configured to switch the switching valve while the fraction collector in use is not performing a peak collection operation.

2. The preparative liquid chromatograph according to claim 1, wherein in a case where the number of the unused collection containers of the fraction collector in use falls below the predetermined number while the fraction collector in use is performing a peak collection operation, the controller is configured to switch the switching valve immediately after the peak collection operation, which is performed by the fraction collector in use, is completed.

3. The preparative liquid chromatograph according to claim 1, wherein the controller includes a storage part configured to store an integer of two or more set by a user as the predetermined number.

4. The preparative liquid chromatograph according to claim 1, wherein the controller is configured to detect a start point and an end point of each peak based on a peak waveform of a chromatogram created by using an output signal from the detector, and to control operations of the plurality of fraction collectors and the switching valve based on the detected start point and end point of each peak.

* * * * *